(12) United States Patent
Sauer et al.

(10) Patent No.: US 7,676,074 B2
(45) Date of Patent: Mar. 9, 2010

(54) SYSTEMS AND METHODS FOR FILTERING DATA IN A MEDICAL IMAGING SYSTEM

(75) Inventors: Ken David Sauer, South Bend, IN (US); Charles Addison Bouman, West Lafayette, IN (US); Jiang Hsieh, Brookfield, WI (US); Jean-Baptiste Thibault, Milwaukee, WI (US)

(73) Assignees: Purdue Research Foundation, West Lafayette, IN (US); The University of Notre Dame du lac, Notre Dame, IN (US); General Electric Company, Schenectady, NY (US)

( * ) Notice: Subject to any disclaimer, the term of this patent is extended or adjusted under 35 U.S.C. 154(b) by 809 days.

(21) Appl. No.: 11/224,413

(22) Filed: Sep. 12, 2005

(65) Prior Publication Data

US 2007/0058771 A1 Mar. 15, 2007

(51) Int. Cl.
*G06K 9/00* (2006.01)
*G06K 9/40* (2006.01)

(52) U.S. Cl. ................. 382/131; 382/128; 382/260

(58) Field of Classification Search ........... 382/260, 382/128, 131
See application file for complete search history.

(56) References Cited

U.S. PATENT DOCUMENTS

| | | | | |
|---|---|---|---|---|
| 5,045,952 A | * | 9/1991 | Eschbach | 358/447 |
| 5,243,444 A | * | 9/1993 | Fan | 358/3.08 |
| 5,416,815 A | * | 5/1995 | Hsieh | 378/4 |
| 5,907,593 A | | 5/1999 | Hsieh et al. | |
| 6,438,270 B1 | * | 8/2002 | Harrington | 382/262 |
| 6,529,575 B1 | * | 3/2003 | Hsieh | 378/4 |
| 6,801,594 B1 | | 10/2004 | Ali et al. | |
| 6,907,102 B1 | | 6/2005 | Sauer et al. | |
| 2005/0162704 A1 | * | 7/2005 | He et al. | 358/3.06 |

OTHER PUBLICATIONS

JG Brankov, Y Yang, MN Wernick "Tomographic image reconstruction based on a content-adaptive mesh model", IEEE Transactions on Medical Imaging, vol. 23, No. 2, Feb. 2004, p. 202-212.*
"A local update strategy for iterative reconstruction from projections", Sauer, K. Bouman, C. Signal Processing, IEEE Transactions on, Feb. 1993 vol. 41, Issue: 2, pp. 534-548.*
Bouman, et al.; "A Unified Approach to Statistical Tomography Using Coordinate Descent Optimization," IEEE Trans. on Image Processing, Mar. 1996, vol. 5, No. 3, pp. 480-492.
Analoui, et al.; "Model Based Halftoning Using Direct Binary Search," 1992, Proc. SPIE, vol. 1666, pp. 96-108.
Floyd, et al.; "An Adaptive Algorithm for Spatial Greyscale," Journal of the Society for Information Display, 1976, vol. 17, No. 2, pp. 75-77.
Thibault, Jean-Baptiste, Sauer, Ken, Bouman, Charles and Hsieh, Jiang, "High Quality Iterative Image Reconstruction For Multi-Slice Helical CT," Proceedings Of The Fully 3-D Conference, Jun. 29-Jul. 4, 2003.

* cited by examiner

*Primary Examiner*—Samir A. Ahmed
*Assistant Examiner*—Li Liu
(74) *Attorney, Agent, or Firm*—Armstrong Teasdale LLP (57) ABSTRACT

A method for filtering a measurement of density of an object is described. The method includes filtering the measurement of the density and preserving a local average of the measurement and additional measurements when performing the filtering.

20 Claims, 7 Drawing Sheets

SYSTEMS AND METHODS FOR FILTERING DATA IN A MEDICAL IMAGING SYSTEM

BACKGROUND OF THE INVENTION

This invention relates generally to medical imaging systems and methods and more particularly to system and methods for filtering a measurement of density of an object.

Typically, in computed tomography (CT) imaging systems, a gantry includes an X-ray source that emits a fan-shaped beam toward an object, such as a patient. The beam, after being attenuated by the patient, impinges upon an array of radiation detectors. The intensity of the attenuated beam radiation received at the detector array is typically dependent upon the attenuation of the X-ray beam by the patient. Each detector element of the detector array produces a separate electrical signal indicative of the attenuated beam received by each detector element. The electrical signals are transmitted to a data processing unit for analysis which ultimately results in a formation of an image.

Generally, the X-ray source and the detector array are rotated with a gantry within an imaging plane and around the patient. X-ray sources typically include X-ray tubes, which conduct a tube current and emit the X-ray beam at a focal point. X-ray detectors typically include a collimator for collimating X-ray beams received at the detectors, a scintillator for converting X-rays to light energy adjacent the collimator, and photodiodes for receiving the light energy from the adjacent scintillator. The photodiodes convert the light energy into electrical energy that represents projection data. A projection datum at a projection angle $\theta$ and a projection displacement t is represented as $p(\theta,t)$. A data acquisition system (DAS) receives the projection data from the detectors. One of the CT imaging systems is used to reconstruct a cross-section of the patient object by measuring the projections through the patient.

It is generally difficult to measure the projection datum $p(\theta,t)$ directly. Instead, the projection data is obtained by counting a number of photons impinging on the detectors. A measurement $\lambda(\theta,t)$ at the projection angle $\theta$ and the projection displacement t is proportional to a number of the photons. The measurement $\lambda(\theta,t)$ is corrupted by various kinds of noises, such as, a photon counting noise often modeled by a Poisson distribution or an additive noise often modeled by a Gaussian distribution. The additive noise is generated from dark current in the DAS, interference noise in cables of the CT imaging systems, and other sources. If an image is reconstructed by applying the measurement $\lambda(\theta,t)$ with the noises, shading artifacts are visible in the image.

Usually an expected value of $\lambda(\theta,t)$ is related to the projection datum by an equation $$\bar{\lambda}(\theta,t)=E[\lambda(\theta,t)]=\exp(-p(\theta,t))\lambda_T \quad (A)$$

where E denotes an expectation, $\bar{\lambda}(\theta,t)$ denotes the expected value of $\lambda(\theta,t)$, and $\lambda_T$ denotes a number of photons that are impinging on the patient from the x-ray source. In practice, a value of $\lambda_T$ may vary with the projection datum $p(\theta,t)$. Alternatively, in theory, $\lambda_T$ may be presumed to be a constant. The projection datum $p(\theta,t)$ may be computed from the expected value of $\lambda(\theta,t)$ by using an equation $$p(\theta,t) = -\log\left(\frac{\bar{\lambda}(\theta,t)}{\lambda_r}\right) \quad (B)$$

where log represents a logarithmic ($\log_{10}$) function. A difficulty in applying equation (B) is that a value of $\bar{\lambda}(\theta,t)$ is not known because a noisy value of $\lambda(\theta,t)$ is directly measured.

A first approach used to determined the projection datum $p(\theta, t)$ is to use an approximation $\bar{\lambda}(\theta,t) \cong \lambda(\theta,t)$. If $\bar{\lambda}(\theta,t)$ is large, the approximation is useful because a value of a signal within the electrical energy is large compared to the noises. However, when the patient being imaged is dense and/or large, the attenuation may be large, and the value of $\bar{\lambda}(\theta,t)$ is small. When $\bar{\lambda}(\theta,t)$ is small, $\lambda(\theta,t)$ may have a large percentage error and/or may be negative. The measurement $\lambda(\theta,t)$ may have a large percentage error and/or may be negative because the additive noise in one of the CT imaging systems becomes significant as compared to the photon counting noise. When $\lambda(\theta,t)$ is negative, the approximation of cannot be used because the logarithm of a negative number cannot be computed in equation B.

A second approach is to obtain a plurality of $\lambda(\theta,t)$s and average the $\lambda(\theta,t)$s. The noises in one of the $\lambda(\theta,t)$s are generally independent of the noises in any of the remaining of the $\lambda(\theta,t)$s and so by averaging the $\lambda(\theta,t)$s, the expected value $\bar{\lambda}(\theta,t)$ is obtained. However, the second approach has a number of disadvantages. A first one of the disadvantages is that the second approach uses a higher amount of time to obtain the $\lambda(\theta,t)$s than a time used to obtain the measurement $\lambda(\theta,t)$ because $\lambda(\theta,t)$ is measured multiple times. A second of the disadvantages is that the second approach exposes the patient to harmful radiation when the $\lambda(\theta,t)$ is obtained multiple times. The harmful radiation may result in greater health risk to the patient and the health risk is undesirable.

A third approach is to smooth $\lambda(\theta,t)$ with neighboring values, such as $\lambda(\theta+1,t)$ or $\lambda(\theta,t+1)$, of $\lambda(\theta,t)$. The measurement $\lambda(\theta,t)$ and the neighboring values have nearly equal angles. The measurement $\lambda(\theta,t)$ and the neighboring values also have nearly equal displacements. A smoothing filter is applied to $\lambda(\theta,t)$ and the neighboring values to average $\lambda(\theta,t)$ and the neighboring values. The smoothing filter is applied to produce a smoothed version of the measurement $\lambda(\theta,t)$ and the smoothed version is denoted by $\hat{\lambda}(\theta,t)$. The projection datum $p(\theta,t)$ may be obtained by using an approximation $\bar{\lambda}(\theta,t) \cong \hat{\lambda}(\theta,t)$. The smoothing filter can reduce the noises by averaging but it has flaws. A first one of the flaws is that the smoothing filter may not provide the smoothed version that is positive in value because a group of negative measurements may fall near each other. A second one of the flaws is that averaging $\lambda(\theta,t)$ with the neighboring values tends to blur a resolution of a reconstruction in regions, having high signal-to-noise measurements, that do not require averaging. A third one of the flaws is that a local mean value of a local region may not be preserved, which could lead to shading artifacts in the image.

A Floyd-Steinberg algorithm preserves the local mean value during filtering of the noises. The Floyd-Steinberg algorithm preserves the local mean value by applying binarization. A direct binary search algorithm also preserves the local mean value during filtering of the noises. However, the Floyd-Steinberg error diffusion algorithm and the direct binary search algorithm are generally used for digital halftoning in printing.

BRIEF DESCRIPTION OF THE INVENTION

In one aspect, a method for filtering a measurement of density of an object is described. The method includes filtering the measurement of the density and preserving a local average of the measurement and additional measurements when performing the filtering.

In another aspect, a filter for filtering a measurement of a density of an object scanned within a medical imaging system is described. The filter is configured to control an amount of smoothing based on a value of the measurement of the density, configured to output a positive value from the measurement, and configured to preserve a local average of the measurement and additional measurements by distributing an error at a pixel to at least one additional pixel adjacent to the pixel.

In yet another aspect, an imaging system is described. The imaging system includes a source configured to generate energy attenuated by an object, a detector configured to detect the attenuated energy received from the object and to generate a measurement from the attenuated energy, and a filter configured to compute an error from an estimated measurement and an actual measurement obtained by scanning the object with the source and the detector. The filter is further configured to distribute the error to a plurality of pixels and preserve a local average during the distribution of the error.

DETAILED DESCRIPTION OF THE INVENTION

Figure 1:
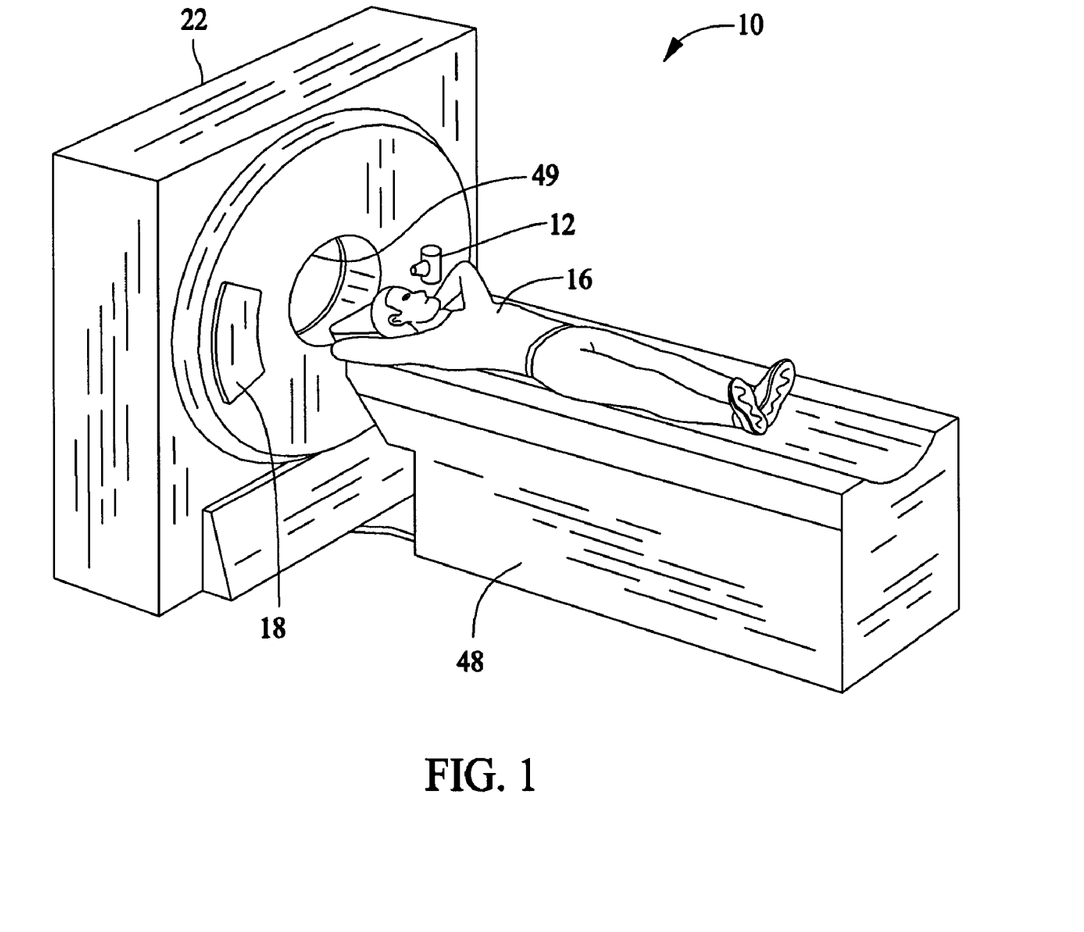
FIG. 1 is an isometric view of an embodiment of a computed tomography system in which a method for filtering a measurement of a density of an object is implemented.
Figure 2:
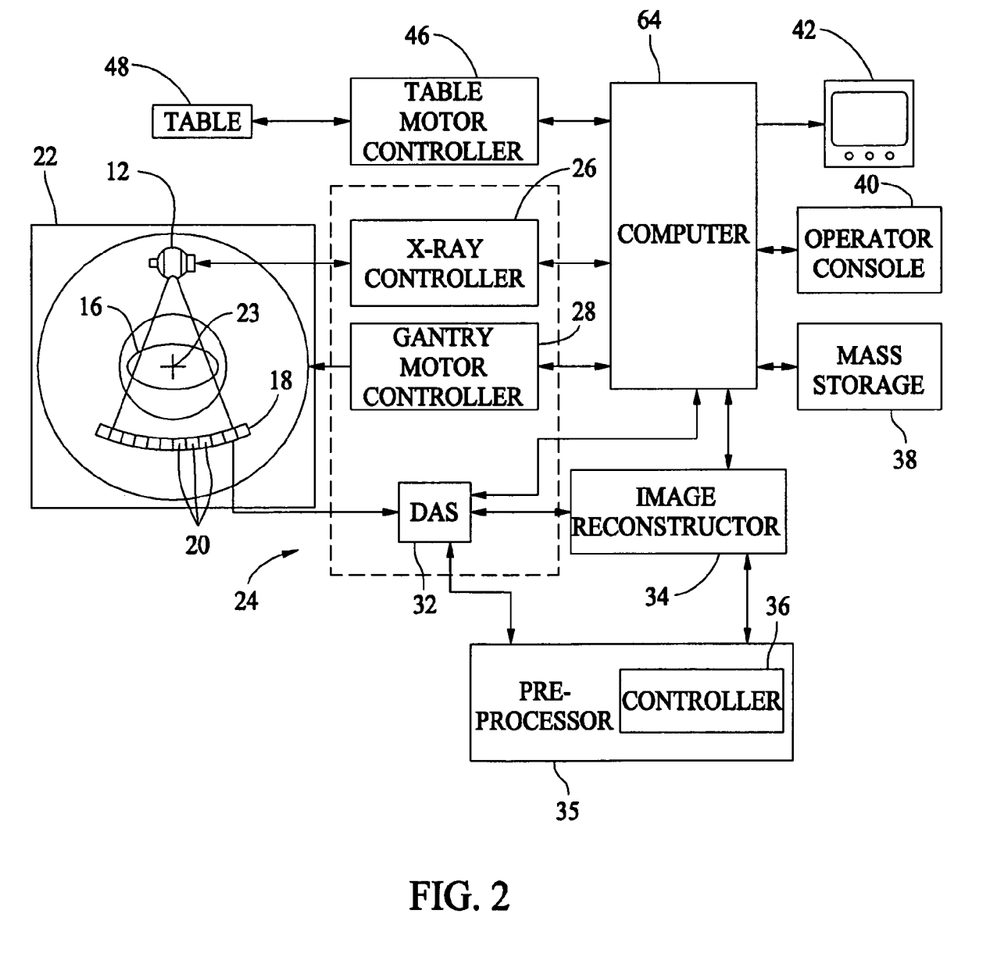
FIG. 2 is a block diagram of an embodiment of the computer tomography system of FIG. 1.

Referring to FIGS. 1 and 2, a computed tomography (CT) imaging system 10 is shown as including a gantry 22. CT system 10 is a "third generation" CT system. In an alternative embodiment, CT system 10 may be an energy integrating, a photon counting (PC), or a photon energy discriminating (ED) CT detector system. Gantry 22 has an x-ray source 12 that projects a beam of x-rays toward a detector array 18. The x-rays pass through an object 16, such as a patient, to generate attenuated x-rays. Object 16 lies along a z-axis. A height of object 16 is parallel to the z-axis. Detector array 18 is formed by a plurality of detector elements 20 which together sense the attenuated x-rays. A row of detector array 18 is located along an x-axis and a column of detector array 18 is located along a y-axis. In an alternative embodiment, each detector element 20 of detector array 18 may be a photon energy integrating detector, a photon counting, or a photon energy discriminating detector. Each detector element 20 produces an electrical signal that represents an intensity of the attenuated x-rays. During a scan to acquire projection data, gantry 22 and components mounted on gantry 22 rotate about a center of rotation 23.

Figure 3:
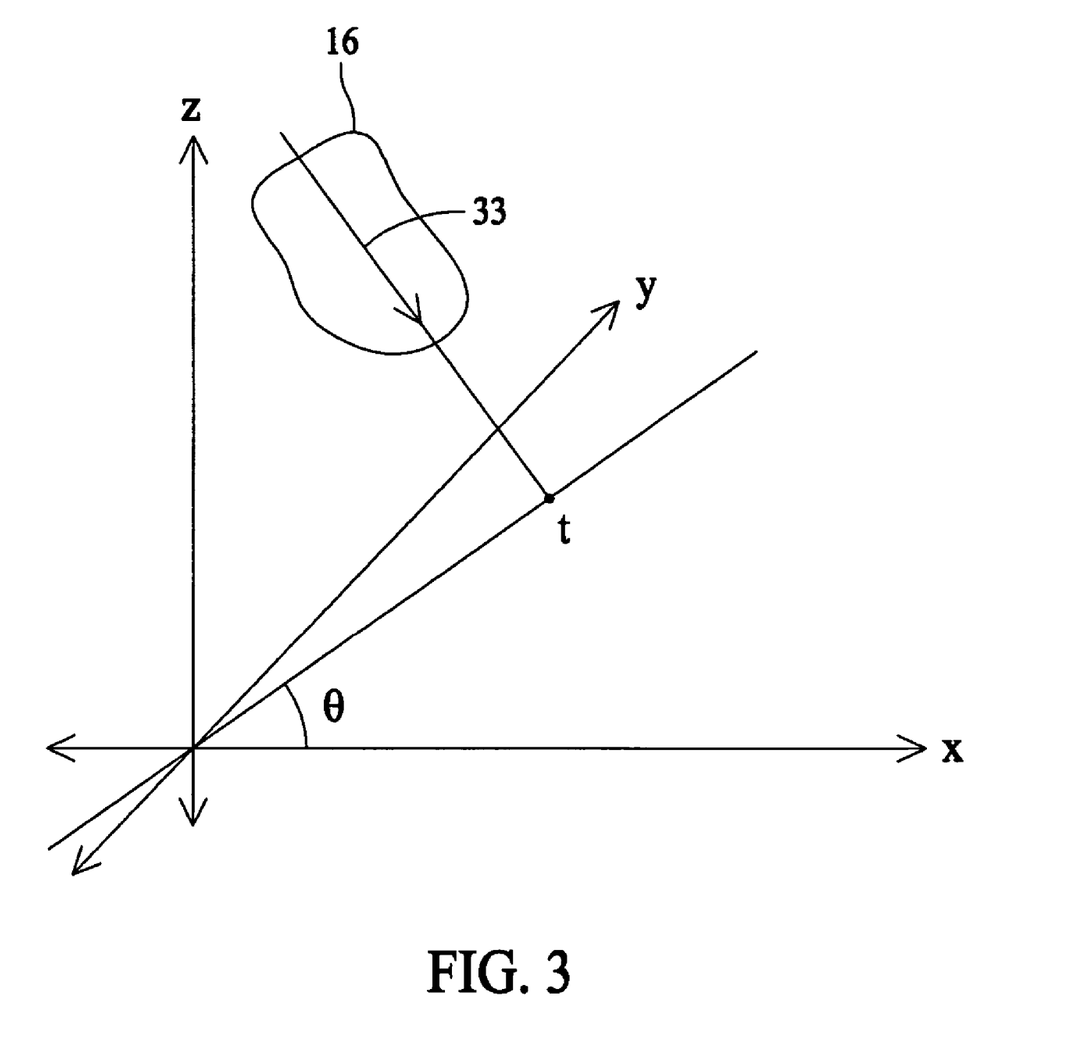
FIG. 3 is a graphical representation of an embodiment of a projection line passing through the object.

Rotation of a gantry 22 and an operation of x-ray source 12 are governed by a control mechanism 24 of CT system 10. Control mechanism 24 includes an x-ray controller 26 that provides power and timing signals to x-ray source 12 and a gantry motor controller 28 that controls a rotational speed and position of gantry 22. A data acquisition system (DAS) 32 in control mechanism 24 samples and digitizes the projection data from detector elements 20 and converts the projection data to sampled and digitized projection data for subsequent processing. As shown in FIG. 3, each projection datum at a projection angle θ and a projection displacement t is expressed as $$p(\theta, t) = \int_{-\infty}^{\infty} \mu(-z\sin(\theta) + t\cos(\theta), z\cos(\theta) + t\sin(\theta))\,dz \quad (1)$$

where $\mu=\mu(x,y)$, is a density of a cross-section of object 16, and specifies a rate at which photons from x-ray source 12 are absorbed by object 16, x represents a dimension along the x-axis, and y represents a dimension along the y-axis, and z represents a dimension along the z-axis. The projection data is obtained from a measurement of photons received by detector array 18 as the photons pass through object 16 along a line 33 of projection shown in FIG. 3. The measurement generated by detector element 20 at a projection view i and a channel j within detector array 18 is denoted by $\lambda(i,j)$, where detector element 20 at a location (i,j) corresponds to the projection angle θ and the projection displacement t. The measurement $\lambda(\theta,t)$ is proportional to a number of photons detected by detector array 18 at the projection angle θ and the projection displacement t. In an alternative embodiment, the measurement is expressed in three-dimensions, where a third dimension is along a row of detector array 18.

Referring back to FIGS. 1 and 2, a pre-processor 35 receives sampled and digitized original projection data from DAS 32 to pre-process the sampled and digitized projection data. In one embodiment, pre-processing includes, but is not limited to, an offset correction, a primary speed correction, a reference channel correction, an air-calibration, and applying a method for filtering a measurement of a density of an object. A controller 36 located within pre-processor 35 applies a method for filtering a measurement of a density of an object on the sampled and digitized projection data. As used herein, the term controller is not limited to just those integrated circuits referred to in the art as a controller, but broadly refers to a processor, a microprocessor, a microcontroller, a programmable logic controller, an application specific integrated circuit, and another programmable circuit, and these terms are used interchangeably herein. Pre-processor 35 pre-processes the sampled and digitized projection data to generate pre-processed projection data.

An image reconstructor 34 receives the pre-processed projection data from pre-processor 35 and performs image reconstruction, such as, filtered backprojection (FBP), iterative maximum likelihood expectation maximization (ML-EM), maximum a posteriori iterative coordinative descent (MAP-ICD), or algebraic reconstruction technique (ART), to generate a reconstructed image. The reconstructed image is applied as an input to a computer 64 which stores the reconstructed image in a mass storage device 38. As used herein, the term computer is not limited to just those integrated circuits referred to in the art as a computer, but broadly refers to a processor, a microcontroller, a programmable logic controller, an application specific integrated circuit, and another programmable circuit, and these terms are used interchangeably herein. X-ray controller 26 adjusts a tube current within x-ray source 12 based on a quality of the reconstructed image.

Computer 64 also receives commands and scanning parameters from a user, such as an operator, via a console 40 that has a user interface device. A cathode ray tube display 42 allows a user, such as an operator, to observe the reconstructed image and other data from computer 64. The commands and scanning parameters are used by computer 64 to provide control signals and information to DAS 32, x-ray controller 26, and gantry motor controller 28. In addition, computer 64 operates a table motor controller 46 which controls a motorized table 48 to position object 16 within gantry 22. Particularly, table motor controller 46 adjusts table 48 to move portions of object 16 and center object 16 in a gantry opening 49.

In an alternative embodiment, a high frequency electromagnetic energy projection source configured to project high frequency electromagnetic energy toward object 16 may be used instead of x-ray source 12. A detector array disposed within a gantry and configured to detect the high frequency electromagnetic energy may also be used instead of detector array 18.

Also as used herein, reconstruction of an image is not intended to exclude embodiments of the systems and methods for filtering a measurement of a density of an object in which data representing an image is generated but a viewable image is not. Many embodiments of the systems and methods for filtering a measurement of a density of an object generate or are configured to generate at least one viewable image.

Figure 4:
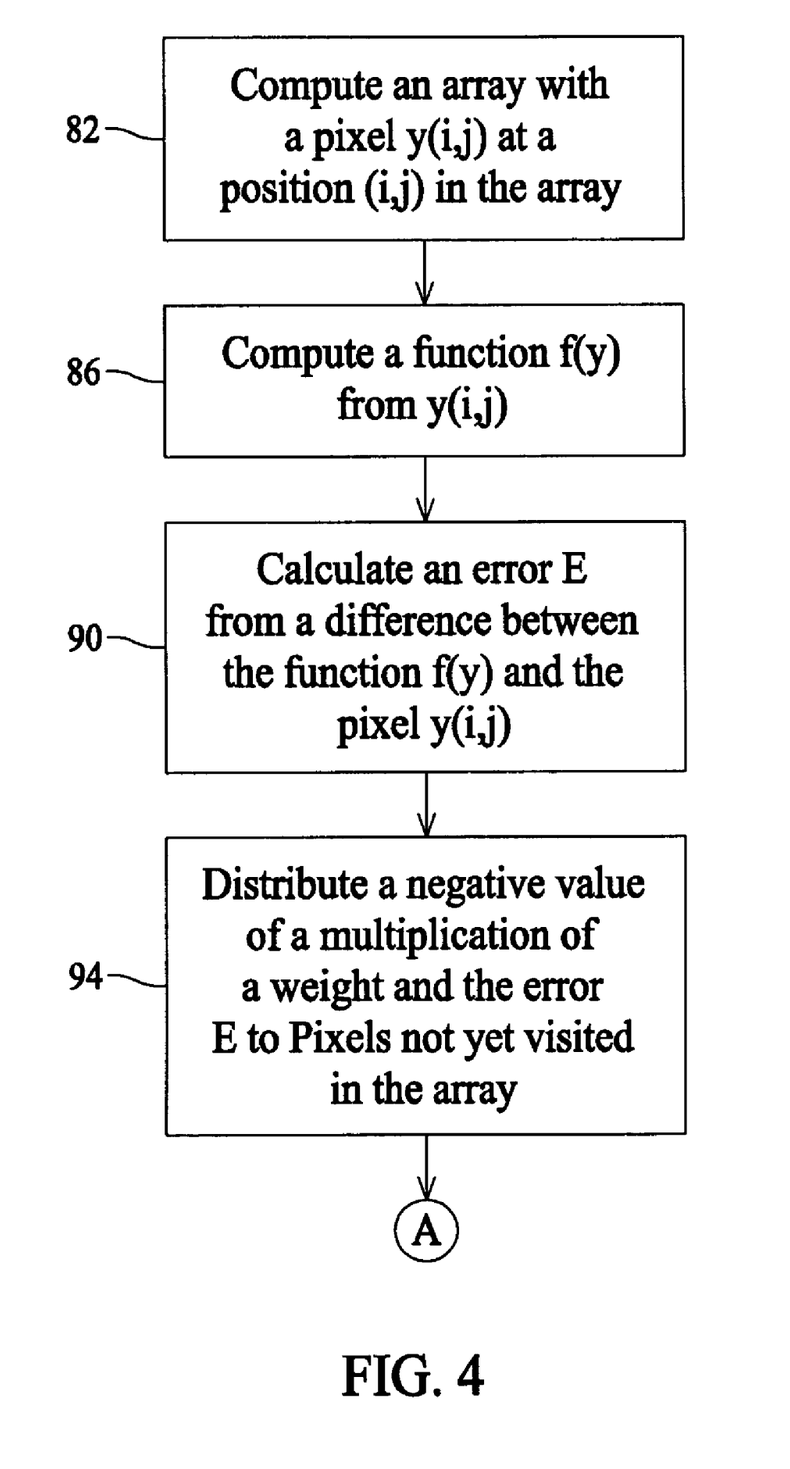
FIG. 4 is a flowchart of an embodiment of the method for filtering a measurement of a density of the object.
Figure 5:
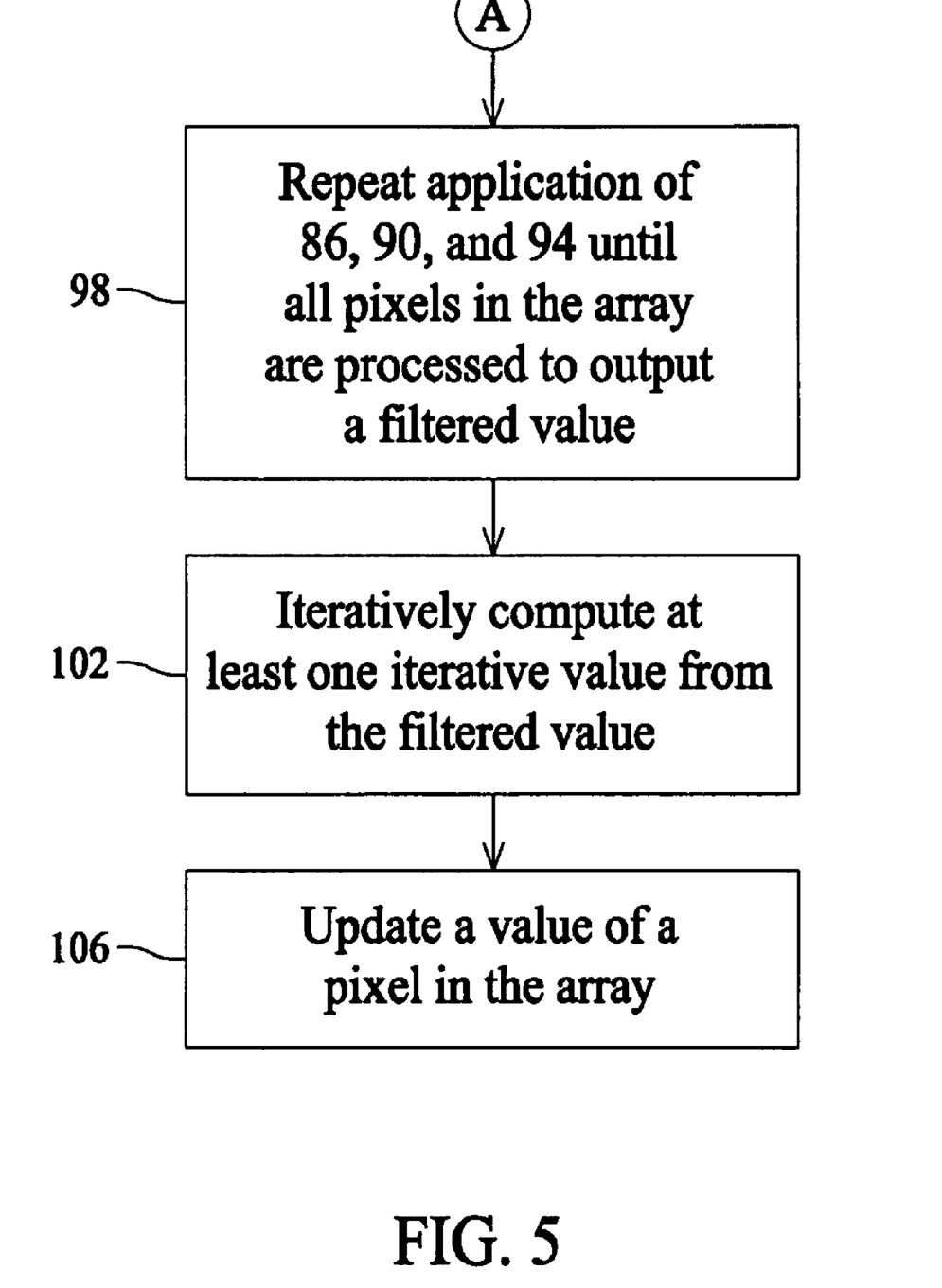
FIG. 5 is a continuation of the flowchart of FIG. 4.

FIGS. 4 and 5 are a flowchart of an embodiment of a method for filtering a measurement of a density of object 16. Controller 36 computes an input array with a pixel $y(i,j)$ at a position $(i,j)$ in the input array. In the position $(i,j)$, i is along a channel of detector array 18 and j is along a row of detector array 18. The pixel $y(i,j)$ represents detector element 20 in detector array 18. For example, a pixel $y(1,3)$ represents detector element 20 at a Cartesian co-ordinate position $(1,3)$ in detector array 18. The pixel $y(i,j)$ is computed from the measurement $\lambda(i,j)$ and additional pixels at other positions of the input array are calculated from additional measurements, similar to $\lambda(i,j)$. Controller 36 computes the input array by initializing $y(i,j)$ to be equal to $\lambda(i,j)$ and initializing the additional pixels to the additional measurements. Controller 36 computes the input array by assigning $\lambda(i,j)$ to $y(i,j)$ and assigning the additional measurements to the additional pixels. For example, controller 36 assigns $\lambda(1,2)$ to $y(1,2)$. As another example, controller 36 assigns $\lambda(3,1)$ to $y(3,1)$.

Controller 36 computes a function $f(y)$ from $y(i,j)$ for one value of $(i,j)$. An example of the function $f(y)$ is a non-linear function that yields a positive value for any $y(i,j)$. Another example of the function $f(y)$ is $$f(y) = \sigma \log(\exp(y/\sigma)+1) \qquad (2)$$

where σ is a parameter that can be adjusted manually or alternatively by controller 36 for optimizing filtering of the measurement $\lambda(i,j)$. By applying equation (2), positive pixel values of $y(i,j)$ are computed. Moreover, by applying equation (2), regions of $\lambda(i,j)$ with a high signal-to-noise ratio are not substantially changed. Two-dimensional filtering, such as described by equation (2), is applied to any combination of two of a projection view, a channel, and a row of detector array 18. For example, equation (2) is applied first to a projection view A and a channel A of detector array 18, and second to a channel B and a row C of detector array 18. As another example, equation (2) is applied first to a channel A and a row C of detector array 18, second to a projection view B and a channel D of detector array 18, and third to a projection view C and a row B of detector array 18. Alternatively, three-dimensional filtering, such as described by equation (2), is applied at the same time to a projection view, a channel, and a row of detector array 18. For example, the three-dimensional filtering is applied to a projection view A, a row B, and a channel C of detector array 18.

A set of weights, $w_1$, $w_2$, $w_3$, and $w_4$ are input into controller 36 via console 40. An example of the weight $w_1$ is $7/16$, of the weight $w_2$ is $1/16$, of the weight $w_3$ is $5/16$, and of the weight $w_4$ is $3/16$. In an alternative embodiment, $w_1$ equals $w_2$, $w_2$ equals $w_3$, and $w_3$ equals $w_4$. The weights are normalized when a sum of the weights in the set is set equal to one. In an alternative embodiment, the sum of the weights is manually input via console 40 into controller 36 and controller 36 determines the weights from the sum. A local average of a value of the pixel $y(i,j)$ and a plurality of neighboring pixels, such as pixels adjacent to the pixel $y(i,j)$, of the input array is preserved by normalizing the weights.

Controller 36 calculates an error E from a difference between the function $f(y)$ and the pixel $y(i,j)$. The error E is represented as $$E = f(y(i,j)) - y(i,j) \qquad (3)$$

Controller 36 distributes a negative value of a multiplication of one of the weights and the error E to pixels not yet visited in the input array. As an example shown in FIG. 6, a value of $y(i,j+1)-w_1E$ is assigned to $y(i,j+1)$, a value of $y(i+1,j+1)-w_2E$ is assigned to $y(i+1,j+1)$, a value of $y(i+1,j)-w_3E$ is assigned to $y(i+1,j)$, and a value of $y(i+1,j-1)-w_4E$ is assigned to $y(i+1,j-1)$. As another example, a value of $y(i,j-1)-w_1E$ is assigned to $y(i,j-1)$, a value of $y(i+1,j-1)-w_2E$ is assigned to $y(i+1,j-1)$, a value of $y(i+1,j)-w_3E$ is assigned to $y(i+1,j)$, and a value of $y(i+1,j+1)-w_4E$ is assigned to $y(i+1,j+1)$. The pixels not yet visited are located at positions in the input array at which the error E is not computed when controller 36 distributes the negative value to the pixels not yet visited. In one embodiment, the pixels not yet visited are adjacent to the pixel $y(i,j)$. After the negative value is distributed, a local average of a value of the pixel $y(i,j)$ and the pixels not yet visited to which the negative value is distributed is preserved. As an example, the local average is the same before and after the negative value is distributed. As another example, the local average matches a local average of the measurement $\lambda(i,j)$ and other measurements, such as $\lambda(i,j+1)$, whose values are initially assigned by controller 36 to the pixels not yet visited.

Figure 6:
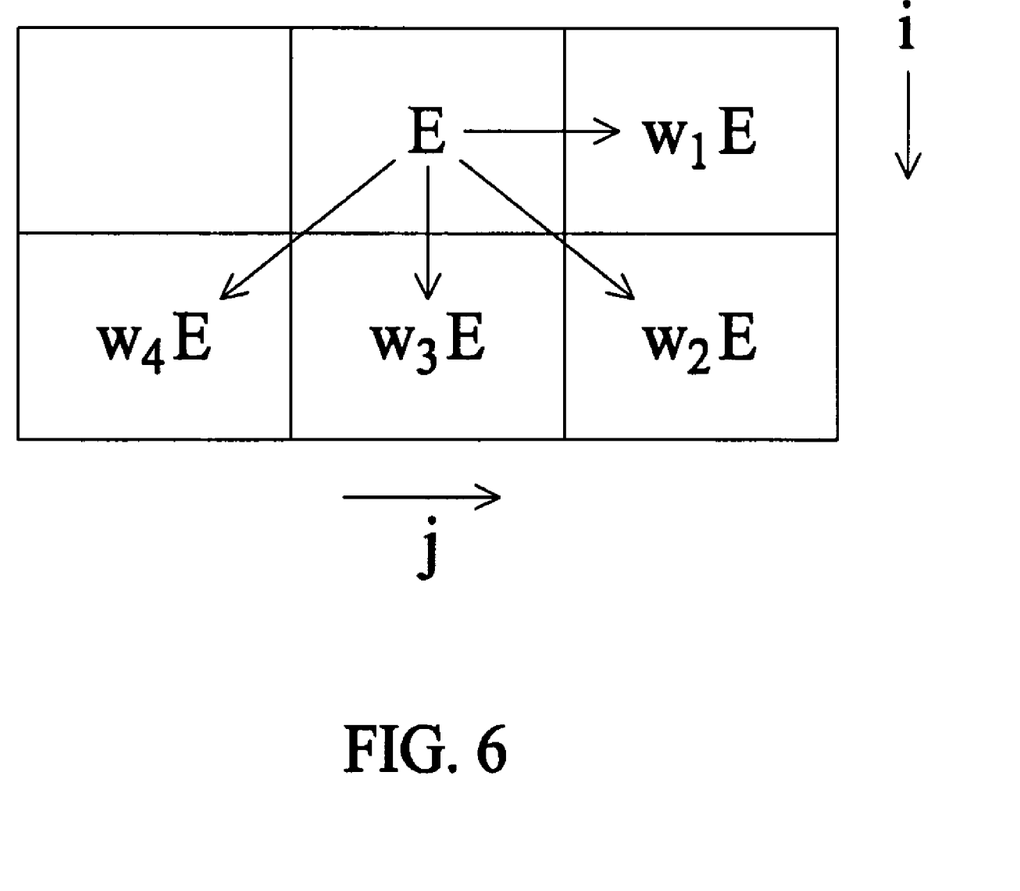
FIG. 6 is a block diagram showing an embodiment of error distribution implemented within the method for filtering a measurement of a density of the object.

In an alternative embodiment, a different number of weights than four weights $w_1$, $w_2$, $w_3$, and $w_4$ are input into controller 36 via console 40. For example, in addition to the distribution shown in FIG. 6, a value of $y(i+2,j-1)-w_5E$ is assigned to $y(i+2,j-1)$, where a sum of weights $w_1$, $w_2$, $w_3$, $w_4$, and $w_5$ equals one. As another example, all distributions exemplified by FIG. 6 are made except that no distribution is made to $y(i+1,j)$, where a sum of weights $w_1$, $w_2$, and $w_4$ equals one.

Referring back to FIGS. 4 and 5, controller 36 selects a pixel in the input array other than the pixel $y(i,j)$ in an order, such as, a serpentine or a raster order, following the pixel $y(i,j)$, applies 86, 90, and 94 on the selected pixel, and continues 98 to apply 86, 90, and 94 until all pixels in the input array are processed in the order. After all pixels in the input array are processed by distributing the negative value, the pixels have filtered values that are positive. There is an insubstantial change, such as within 5%, in positive values of pixels in the input array before and after all the pixels in the input array are processed by distributing the negative value. For example, if a positive value of the pixel $y(i,j)$ is b unit before all the pixels in the array are processed by distributing the negative value, a value of the pixel is (b+5%) unit after all the pixels are processed. One of the filtered values at position $(i,j)$ is represented as $y_{fil}(i,j)$.

In an alternative embodiment, controller 36 iteratively computes 102 at least one iterative value from the filtered value $y_{fil}(i,j)$ by applying an equation represented as $$\hat{y}(i, j) = \arg\min_{y_{fil} > 0} \left\{ \begin{array}{l} \sum_{i,j}(\lambda(i, j) - y_{fil}(i, j))^2 + \\ \gamma \sum_{(i,j) \neq (k,l)} b_{i-k, j-l}(f_1(y_{fil}(k, l)) - \\ f_2(y_{fil}(i, j)))^2 \end{array} \right\} \quad (4)$$

where $y_{fil}(k,l)$ is obtained by controller 36 at a position (k,l) in the input array in a similar manner as $y_{fil}(i,j)$ is obtained, (k,l) is a position different than (i,j), $f_1$ is a non-linear function, such as a logarithmic ($\log_{10}$) function, $f_2$ is a non-linear function, such as a logarithmic ($\log_{10}$) function, $$\sum_{(i,j) \neq (k,l)} b_{i-k, j-l} = 1,$$

and $\gamma$ is a constant. Controller 36 iteratively computes 102 by calculating $\hat{y}(i,j)$ and then substituting $\hat{y}(i,j)$ for $y_{fil}(i,j)$ in equation (4). The user can select via console 40 a number of iterations to be performed by controller 36 in applying equation (4).

In another alternative embodiment, controller 36 controls the constant $\gamma$ to control an amount of smoothing of $y_{fil}(i,j)$ in equation (4). For example, if $\gamma$ is larger than a pre-determined threshold input via console 40, controller 36 performs a small amount of smoothing by applying equation (4). The small amount of smoothing is smaller than an amount of smoothing performed by applying equation (4) if $\gamma$ is larger than the pre-determined threshold. Optionally, the user operating console 40 directly inputs $\gamma$ to control an amount of smoothing performed by applying equation (4). Controller 36 or alternatively the user reduces an amount of smoothing performed by applying equation (4) as a value of the measurement $\lambda(i,j)$ increases. For example, when the measurement $\lambda(i,j)$ increases beyond a first pre-determined point input into console 40, controller 36 or alternatively the user decreases $\gamma$ to a first value. When the measurement $\lambda(i,j)$ increases beyond a second pre-determined point input into console 40, controller 36 or alternatively the user further decreases $\gamma$ to a second value lower than the first value. The second pre-determined point is greater than the first pre-determined point. Similarly, controller 36 or alternatively the user increases an amount of smoothing performed by applying equation (4) as a value of the measurement $\lambda(i,j)$ decreases. For example, when the measurement $\lambda(i,j)$ decreases beyond the second pre-determined point input into console 40, controller 36 or alternatively the user increases $\gamma$ the second value. When the measurement $\lambda(i,j)$ decreases beyond the first pre-determined point, controller 36 or alternatively the user further increases $\gamma$ to the first value.

Controller 36 updates 106 a value of a neighboring pixel in the input array at a position (m,n) by applying an equation represented as $$\hat{y}(m, n) = \arg\min_{y_{fil}(m,n) > 0} \left\{ \begin{array}{l} \sum_{i,j}(\lambda(m, n) - y_{fil}(m, n))^2 + \\ \gamma \sum_{(i,j) \neq (m,n)} b_{i-m, j-n}(f_3(y_{fil}(m, n)) - \\ f_4(y_{fil}(i, j)))^2 \end{array} \right\} \quad (5)$$

where $$\sum_{(i,j) \neq (m,n)} b_{i-m, j-n} = 1, \lambda(m, n)$$

is obtained by controller 36 at position (m,n) in the input array in a similar manner as $\lambda(i,j)$ is obtained by controller 36 at position (i,j), $y_{fil}(m,n)$ is obtained in a similar manner at the position (m,n) as $y_{fil}(i,j)$ is obtained at the position (i,j), $f_3$ is a non-linear function, such as a logarithmic ($\log_{10}$) function, $f_4$ is a non-linear function, such as a logarithmic ($\log_{10}$) function, and (m,n) is a position in the input array different from the position (i,j). In one embodiment, controller 36 continues to update pixels in the input array that are not updated by applying equation (5) and updates the pixels once. Once pixels in the input array that are not updated are updated once, controller 36 can update the pixels for a second time or more times as input by the user via console 40. When pixels in the input array that are not updated are updated by applying equation (5), the pixels are updated in a sequential order. For example, immediately after y(m,n) is updated by applying equation (5), y(m+1,n) is updated by applying an equation (6) generated by substituting y(m+1,n) instead of y(m,n) in equation (5) and substituting y(m,n) instead of y(i,j) in equation (5). Equation (6) is represented as $$\hat{y}(m + 1, n) = \quad (6)$$

$$\arg\min_{y_{fil}(m+1,n) > 0} \left\{ \begin{array}{l} \sum_{m,n}(\lambda(m + 1, n) - y_{fil}(m + 1, n))^2 + \\ \gamma \sum_{(m+1,n) \neq (m,n)} b_{m-(m+1), n-n}(f_3(y_{fil}(m + 1, n)) - \\ (f_4(\hat{y}(m, n)))^2 \end{array} \right\}$$

where $$\sum_{(m+1,n) \neq (m,n)} b_{m-(m+1), n-n} = 1, \lambda(m + 1, n)$$

is obtained by controller 36 at a position (m+1,n) in the input array in a similar manner as $\lambda(i,j)$ is obtained at position (i,j), and $y_{fil}(m+1,n)$ is obtained by controller 36 at the position (m+1,n) in a similar manner as $y_{fil}(i,j)$ is obtained at the position (i,j). As another example, immediately after y(m,n) is updated by applying equation (5), y(m,n+1) is updated by applying an equation (7) generated by substituting y(m,n+1) instead of y(m,n) in equation (5) and substituting y(m,n) instead of y(i,j) in equation (5). Equation (7) is represented as $$\hat{y}(m, n+1) = \qquad (7)$$

$$\arg\min_{y_{fil}(m,n+1)>0} \left\{ \begin{array}{l} \sum_{i,j}(\lambda(m,n+1) - y_{fil}(m,n+1))^2 + \\ \gamma \sum_{(m,n+1)\neq(m,n)} b_{m-m,n-(n+1)}(f_3(y_{fil}(m,n+1)) - \\ f_4(\hat{y}(m,n)))^2 \end{array} \right\}$$

where $$\sum_{(m,n+1)\neq(m,n)} b_{m-m,n-(n+1)} = 1, \lambda(m, n+1)$$

is obtained by controller 36 at position (m,n+1) in the input array in a similar manner as $\lambda(i,j)$ is obtained at position (i,j), and $y_{fil}(m,n+1)$ is obtained by controller 36 at the position (m,n+1) in a similar manner as $y_{fil}(i,j)$ is obtained at the position (i,j).

Each time a pixel is updated in the input array, the neighboring pixels, such as pixels adjacent to the pixel, are affected by the term $f_3(y_{fil}(m,n))-f_4(y_{fil}(i,j))$ in equation (5), term $(f_3(y_{fil}(m+1,n))-f_4(\hat{y}(m,n)))$ in equation 6, and term $(f_3(y_{fil}(m,n+1))-f_4(\hat{y}(m,n)))$ in equation 7.

By applying equations (5) and (6), a difference between an actual measurement $\lambda(m,n)$ and an estimated measurement $y_{fil}(m,n)$ is propagated to a neighboring pixel $y_{fil}(m+1,n)$ and the difference is propagated to match a local average of the measurement $\lambda(i,j)$ and additional measurements, such as $\lambda(i+1,j)$, with a local average of $y(i,j)$ and additional pixels, such as $y(i+1,j)$, obtained from the additional measurements. Similarly, by applying equations (5) and (7), a difference between an actual measurement $\lambda(m,n)$ and an estimated measurement $y_{fil}(m,n)$ is propagated to a neighboring pixel $y_{fil}(m,n+1)$ and the difference is propagated to match a local average of $\lambda(i,j)$ and additional measurements, such as $\lambda(i+1,j)$, with a local average of $y(i,j)$ and additional pixels, such as $y(i+1,j)$, obtained from the additional measurements. It is noted that in an alternative embodiment, controller 36 may not iteratively compute 102. In another alternative embodiment, controller 36 may not control the constant γ to control an amount of smoothing of $y_{fil}(i,j)$ in equation (4).

Controller 36 provides a filtered projection datum from one of $y_{fil}(i,j)$, $\hat{y}(i,j)$, and $\hat{y}(m,n)$ by applying an equation (8) represented as $$p_{fil}(\theta, t) = -f_5\left(\frac{s(\theta, t)}{\lambda_T}\right) \qquad (8)$$

where $f_5$ is a non-linear function, such as a logarithmic ($\log_{10}$) function, $s(\theta,t)$ is one of $y_{fil}(i,j)$, $\hat{y}(i,j)$, and $\hat{y}(m,n)$, $\lambda_T$ is a number of photons from x-ray source 12 impinging on object 16. In an alternative embodiment, $\lambda_T$ is a constant. When $f_5$ is a logarithmic function, a negative of $f_5$ is a negative logarithmic operation.

The filtered projection datum and other filtered projection data, such as $p_{fil}(\theta+2°,t+1)$, similar to the filtered projection datum, are provided by controller 36 to image reconstructor 34 to reconstruct an image. Image reconstructor 34 receives the filtered projection datum and the other filtered projection data, applies a reconstruction method, such as FBP, ART, iterative ML-EM, or MAP-ICD, to reconstruct an image. In an alternative embodiment, a method, described in 82, 86, 90, 94, 98, 102, and 106, for filtering a measurement of a density of an object is applied to the sampled and digitized projection data at a time at which an image is being reconstructed by image reconstructor 34 from the filtered projection datum and the other filtered projection data.

Figure 7:
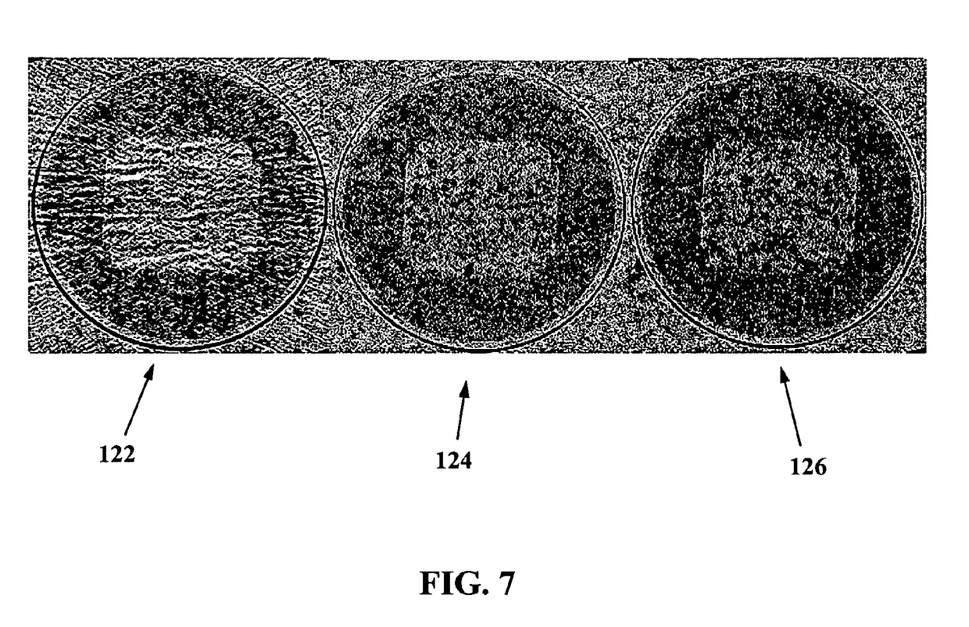
FIG. 7 shows exemplary images illustrating effects of implementing the method for filtering a measurement of a density of the object.

FIG. 7 shows exemplary images before and after applying the methods and systems for filtering a measurement of a density of an object. Image 122 is reconstructed by applying FBP and without applying the methods and systems for filtering a measurement of a density of an object. Bias is visible in image 122. Shading artifacts along projection lines of strong attenuation are visible in image 122. Image 124 is reconstructed by applying iterative-based reconstruction, such as iterative ML-EM or MAP-ICD. Image 124 is reconstructed without applying the methods and systems for filtering a measurement of a density of an object. The bias or the shading artifacts are also visible in image 124. Image 126 is reconstructed by applying the methods and systems for filtering a measurement of a density of an object. The bias or the shading artifacts are less visible in image 126 than in images 122 and 124.

It is noted that in an alternative embodiment, systems and methods for filtering a measurement of a density of an object can be applied to the measurement $\lambda(i,j)$ that can be expressed in three-dimensions. When systems and methods for filtering a measurement of a density of an object are applied to the measurement $\lambda(i,j)$ that can be expressed in three-dimensions, detector elements along a row of the detector array 18 are filtered, for instance, in a particular order, in addition to filtering detector elements 20 along i and j. For example, a negative value of a multiplication of one of the weights and an error, calculated in a similar manner as the error E, is assigned to detector elements along a row of detector array 18 in addition to detector elements 20 along i and j. It is also noted that $\lambda(i,j)$ is an actual measurement and the function $f(y)$ of equation (2) is an estimated measurement.

Technical effects of the systems and methods for filtering a measurement of a density of an object include correcting the shading artifacts along projection lines of strong attenuation by preserving a local average of the measurement $\lambda(i,j)$ and additional measurements. Other technical effects of the systems and methods for filtering a measurement of a density of an object include outputting positive pixel values by applying a nonlinear equation, such as equation (2). Further technical effects of the systems and methods for filtering a measurement of a density of an object include controlling an amount of smoothing based on an attenuation by object 16.

While the invention has been described in terms of various specific embodiments, those skilled in the art will recognize that the invention can be practiced with modification within the spirit and scope of the claims.

What is claimed is:

1. A method for filtering a measurement of density of an object within an imaging system, said method comprising:
   obtaining projection data using the imaging system, the projection data including a plurality of pixels;
   assigning a measured density value to a first pixel of the plurality of pixels;
   applying a nonlinear function to the first pixel to generate a filtered density value of the first pixel;
   determining an error using the filtered density value of the first pixel;
   propagating a negative weighted value of the error to at least a second pixel while preserving a local average of the measurement of density; and reconstructing an image of the object using the measurement of density.

2. A method in accordance with claim 1 further comprising outputting a positive value based on the filtered density value of the first pixel and the negative weighted value.

3. A method in accordance with claim 1 wherein the measurement of density is proportional to a number of photons detected at an angle within a detector array of the imaging system and a displacement within the detector array.

4. A method in accordance with claim 1 further comprising:
    iteratively generating at least one additional filtered value from the filtered density value of the first pixel; and
    controlling an amount of smoothing during said iteratively generating of the at least one additional filtered value.

5. A method in accordance with claim 1 further comprising:
    iteratively generating at least one additional filtered value from the filtered density value of the first pixel;
    increasing, during said interatively generating, an amount of smoothing with a decrease in a value of the measurement of density; and
    decreasing, during said interatively generating, an amount of smoothing with an increase in the value of the measurement of density.

6. A method in accordance with claim 1 wherein the measurement of density is one of an n-dimensional measurement, wherein n is an integer greater than one.

7. A filter for filtering a measurement of a density of an object scanned within a medical imaging system, said filter configured to:
    control an amount of smoothing based on a value of the measurement of density;
    output a positive value from the measurement of density by applying a nonlinear function; and
    preserve a local average of the measurement of density and preserve local average of additional measurements by distributing a negative weighted error of a first pixel to at least a second pixel adjacent to the first pixel.

8. A filter in accordance with claim 7, wherein said filter is further configured to generate a filtered value of the first pixel by applying the nonlinear function to the measurement of density, the filtered value being the positive value.

9. A filter in accordance with claim 8, wherein said filter is further configured to:
    generate a filtered value from the measurement of density;
    iteratively generate at least one additional filtered value from the filtered value of the first pixel; and
    control the amount of smoothing by increasing, during the iterative generation, the amount of smoothing with a decrease in a value of the measurement of density.

10. A filter in accordance with claim 7 wherein the measurement of density is an n-dimensional measurement, wherein n is an integer greater than one.

11. A filter in accordance with claim 7 wherein the measurement of density is proportional to a number of photons detected at an angle within a detector array of the medical imaging system and a displacement within the detector array.

12. A filter in accordance with claim 7, wherein said filter is further configured to:
    generate a filtered value of the first pixel by applying the nonlinear function to the measurement of density;
    iteratively generate at least one additional filtered value from the filtered value of the first pixel;
    increase, during the iterative generation, an amount of smoothing with a decrease in a value of the measurement of density; and
    decrease, during the iterative generation, an amount of smoothing with an increase in the value of the measurement of density.

13. An imaging system comprising:
    a source configured to generate energy attenuated by an object;
    a detector configured to detect the attenuated energy received from a plurality of pixels of the object and to generate an actual measurement from the attenuated energy for each of the End of amendment plurality of pixels; and
    a filter configured to:
        apply a nonlinear function to a first pixel of the plurality of pixels to generate an estimated measurement of the first pixel;
        compute an error from the estimated measurement of the first pixel and an actual measurement of the first pixel obtained by scanning the object with said source and said detector;
        distribute a negative weighted value of the error to the plurality of pixels; and
        preserve a local average of the actual measurement during the distribution of the negative weighted value of the error.

14. An imaging system in accordance with claim 13, wherein the actual measurement is an n-dimensional measurement and the estimated measurement is a function of the actual measurement, and n is an integer.

15. An imaging system in accordance with claim 13, wherein a positive value of one pixel of the plurality of pixels is insubstantially changed upon processing the pixels.

16. An imaging system in accordance with claim 13, wherein at least one of the pixels of the plurality of pixels are not processed during the distribution of the negative weighted value of the error.

17. An imaging system in accordance with claim 13, wherein said filter is configured to control an amount of smoothing based on a value of the actual measurement.

18. An imaging system in accordance with claim 13, wherein said filter is configured to output a positive value based on the estimated measurement of the first pixel.

19. An imaging system in accordance with claim 18, wherein said filter is configured to:
    iteratively generate at least one additional filtered value from the estimated measurement of the first pixel;
    increase, during the iterative generation, an amount of smoothing with a decrease in a value of the actual measurement; and
    decrease, during the iterative generation, an amount of smoothing with an increase in the value of the actual measurement.

20. An imaging system in accordance with claim 13, wherein said filter is further configured to distribute the negative weighted value of the error using a plurality of weighs, the plurality of weights being normalized.

* * * * *